United States Patent [19]

Schröder et al.

[11] Patent Number: 4,689,960
[45] Date of Patent: Sep. 1, 1987

[54] TURBO SUPERCHARGER FOR AN INTERNAL COMBUSTION ENGINE

[75] Inventors: Joachim Schröder; Hanns-Günter Bozung, both of Neusäss; Rudolf Bandel, Augsburg; Hans Mendle, Friedberg, all of Fed. Rep. of Germany

[73] Assignee: M.A.N. - B&W Diesel GmbH, Augsburg, Fed. Rep. of Germany

[21] Appl. No.: 826,560

[22] Filed: Feb. 6, 1986

[30] Foreign Application Priority Data

Feb. 9, 1985 [DE] Fed. Rep. of Germany ....... 3504465

[51] Int. Cl.⁴ .............................................. F02B 33/44
[52] U.S. Cl. ......................................... 60/607; 60/608
[58] Field of Search ........................... 60/607, 609, 608

[56] References Cited

U.S. PATENT DOCUMENTS 3,190,068 6/1965 Williams et al. ....................... 60/607
3,462,071 4/1966 Garve ................................ 60/609 X

FOREIGN PATENT DOCUMENTS 1137087 12/1968 United Kingdom .
1161742 8/1969 United Kingdom .
1203011 8/1970 United Kingdom .
1221344 2/1971 United Kingdom .

Primary Examiner—Stephen F. Husar
Attorney, Agent, or Firm—Frishauf, Holtz, Goodman & Woodward

[57] ABSTRACT

To increase the efficiency of energy transfer from an auxiliary compressed air supply (12, 13, 14) to the compressor blades or vanes (22) of an exhaust gas turbosupercharger compressor (1), auxiliary drive vanes (23) are formed at the compressor wheel, located for reception of streams of compressed air from the auxiliary compressed air supply, the auxiliary compressed air escaping to the compressed air outlet manifold of the turbosupercharger for introduction to an inlet of an internal combustion engine (ICE) if extra charging air is required thereby. The auxiliary compressed air injection nozzles may be formed with bores in a part (17) of the compressor housing or as grooves (40) in the circumference thereof, fitted against a closing flange (39) of another portion of the compressor housing. The auxiliary vanes or blades may be located at or close to the periphery of the compressor wheel (7), either on the front side, where the main compressor blades (22) are located, or on the back side thereof. Preferably, and odd number of injection nozzles (e.g. five, seven, nine) is used.

22 Claims, 12 Drawing Figures

TURBO SUPERCHARGER FOR AN INTERNAL COMBUSTION ENGINE

REFERENCE TO RELATED PUBLICATION

German Pat. No. 1,503,581, to which U.S. Pat. No. 3,462,071, Garve, corresponds.

CROSS REFERENCE TO RELATED APPLICATIONS, ASSIGNED TO THE ASSIGNEE OF THE PRESENT APPLICATION, THE DISCLOSURES OF WHICH ARE HEREBY INCORPORATED BY REFERENCE

U.S. Ser. No. 800,520, filed Nov. 21, 1985, pending BUCHER.

U.S. Ser. No. 821,687, filed Jan. 23, 1986, APPEL U.S. Pat. No. 4,667,769.

The present invention relates to a turbo supercharger for an internal combustion engine, and more particularly to a turbo supercharger for a Diesel engine.

BACKGROUND

Turbosuperchargers for internal combustion engines provide additional charging air to the engine under specific operating conditions. Turbosuperchargers are frequently driven from the exhaust gases of the internal combustion engine (ICE) itself—see, for example, U.S. Pat. No. 3,462,071 (corresponding to German No. 1,503,581). It has also been proposed to operate the turbosupercharger by an external energy source, typically compressed air, which, preferably, also forms part of the supercharging air when the engine should be supercharged although the energy available from exhaust gases is insufficient to effectively drive the exhaust gas supercharger. For example, upon starting of the engine, and to obtain rapid acceleration of the engine, or to obtain a better operation of the engine under accelerating conditions, compressed air is blown into the compressor housing over a plurality of injection ducts. The injection ducts branch off from a compressed air manifold or distribution chamber, formed within the compressor housing of the supercharger. They are so shaped that they direct a stream of compressed air at an inclination on the vanes or blades of the compressor wheel. Usually, the stream direction is at an inclination towards the outer end regions of the vanes or blades. The compressed air stream generates increased torque in the compressor wheel, which increases the speed thereof.

The compressor wheel of the turbosupercharger is fanned; consequently, the spacing of the blades or vanes from each other is relatively high at the outer edge of the compressor wheel. A portion of the energy of the compressed air stream or blast, from the nozzles, thus is wasted and will be blown off without having a torque-increasing effect. The efficiency of additional compressed air injection devices of this kind can hardly be improved due to the geometry of the compressor wheel of the supercharging turbine.

THE INVENTION

It is an object to improve the efficiency of operation of a turbosupercharger compressor under auxiliary compressed air injection conditions.

Briefly, the compressor wheel is formed, besides the ordinary compressor vanes or blades, with auxiliary drive blades or drive vanes, uniformly distributed about the circumference thereof. The axes of the nozzles, formed as nozzle bores or nozzle ducts, and introducing auxiliary compressed air, are located at an angle with respect to the auxiliary blades or vanes which provide for optimum effect of the additional compressed air stream on the auxiliary blades or vanes.

The arrangement has the advantage that the efficiency of the turbine is substantially enhanced when auxiliary compressed air is introduced, so that, in effect, the compressor wheel will accelerate more rapidly than heretofore without additional requirement of compressed air. This, in turn, provides substantially increased charge air, with higher charging pressure to the ICE, thus enhancing rapid acceleration thereof.

DRAWINGS

DETAILED DESCRIPTION

Figure 1:
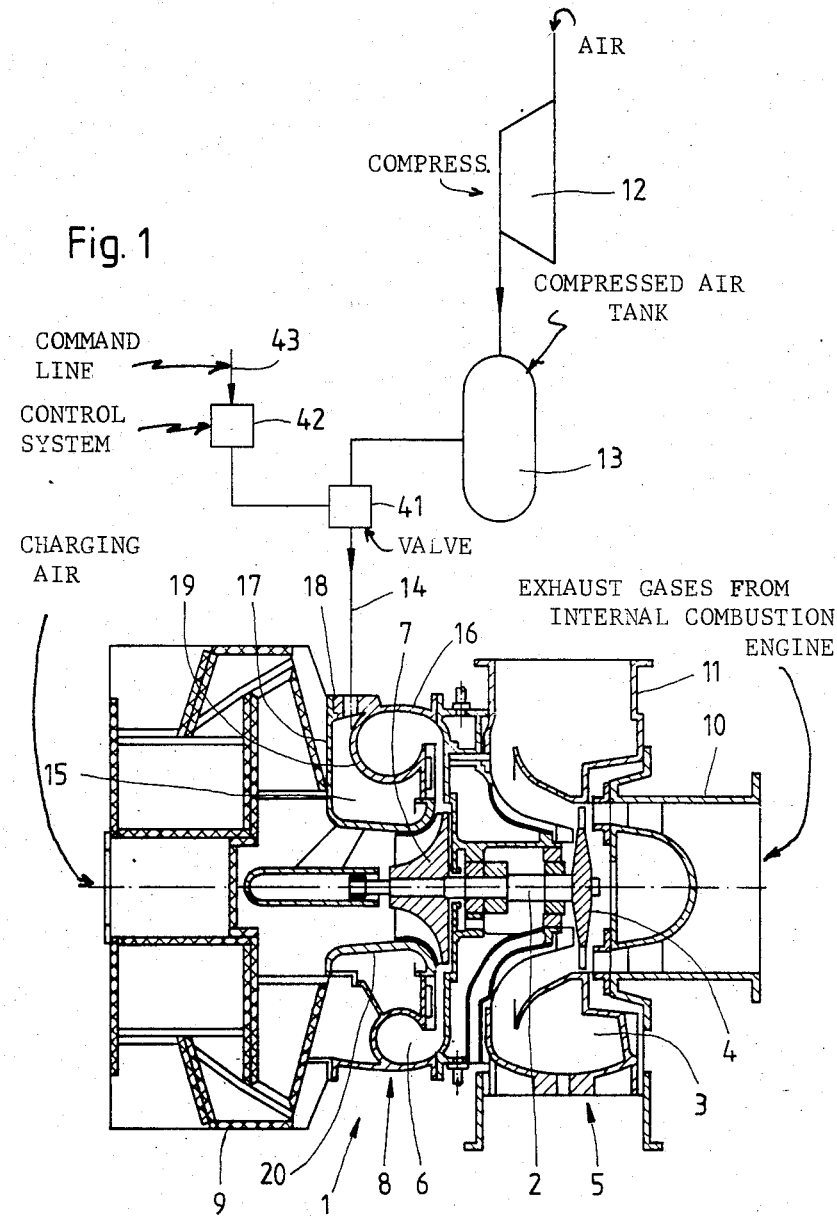
FIG. 1 is a schematic cross-sectional view through an exhaust gas turbosupercharger, included within a turbosupercharging system which is shown in block diagram form.

Referring first to FIG. 1 which, schematically, shows the overall arrangement of a turbosupercharger in a turbosupercharging system for an internal combustion engine (ICE)— not shown. The ICE may be a Diesel engine, but it need not be.

The supercharging system includes a turbosupercharger 1 which is located on a shaft 2, common to a turbine wheel 4, and operating within a turbine housing 3. The turbine wheel 4 forms part of an exhaust gas turbine 5. A compressor housing 6 retains therein a compressor wheel 7, forming part of a charged air compressor 8. An air filter 9 with a noise damper is placed in front of the compressor 8 at the inlet thereof. A suitable noise damping arrangement is shown, for example, in the referenced application Ser. No. 821,687, filed Jan. 23, 1986, APPEL, assigned to the assignee of the present invention, the disclosure of which is hereby incorporated by reference. The output of the compressor housing 6 is coupled to a charge air manifold which, in turn, is coupled to the inlet or induction air ducts of the ICE. The inlet stub 10 of the exhaust gas turbine 5 is coupled to an exhaust manifold of the ICE. The exhaust gases from the exhaust gas turbine 5 are emitted from stub 11.

Figure 4:
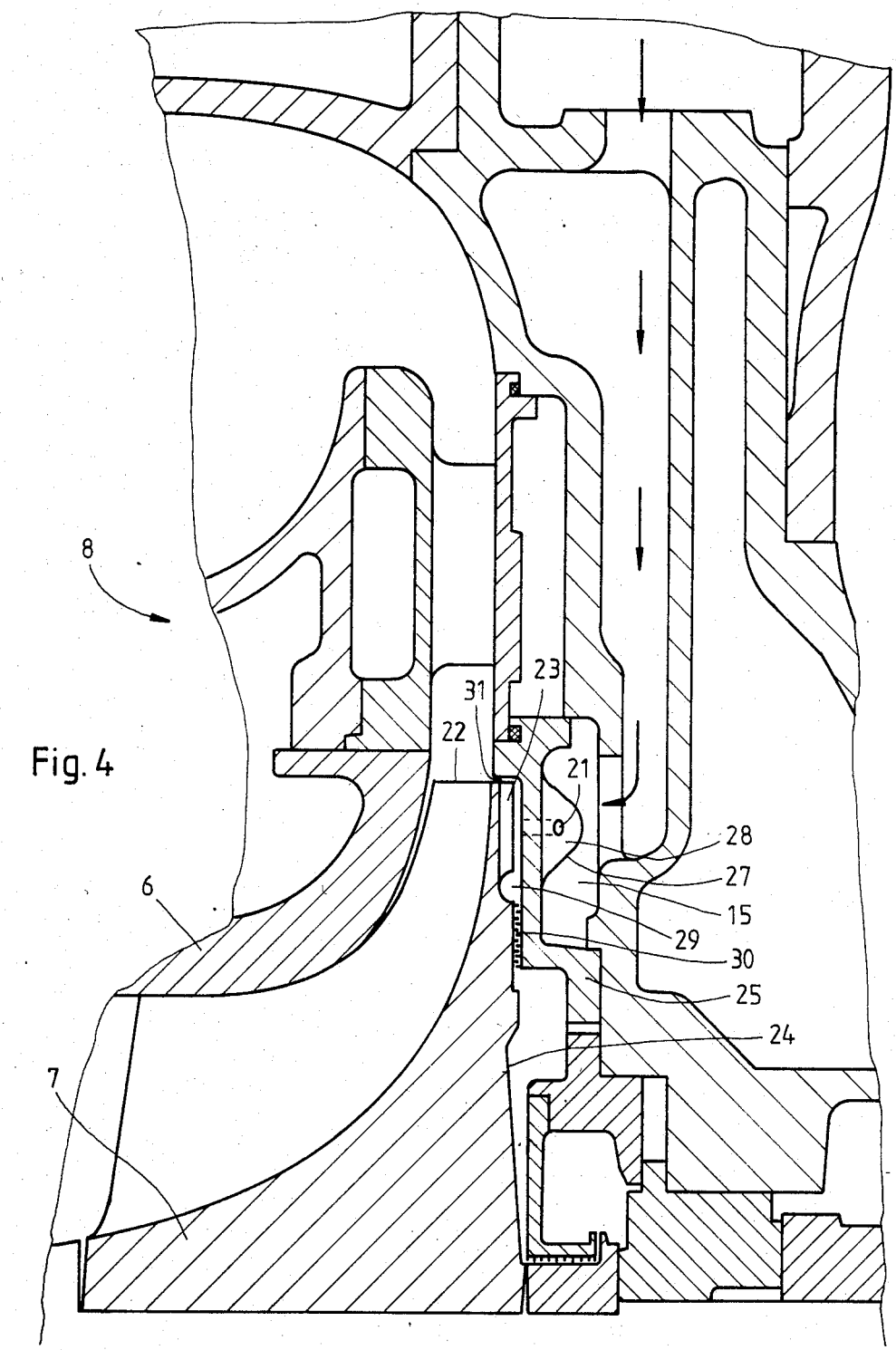
FIG. 4 is a fragmentary cross section through a compressor with yet another embodiment of a compressor wheel and auxiliary vanes.
Figure 5:
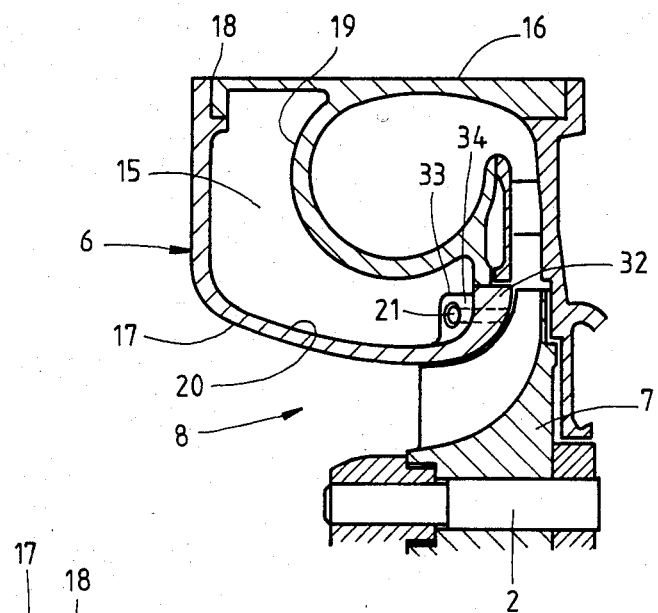
FIG. 5 is an enlarged fragmentary sectional view of the exhaust gas turbosupercharger shown in FIG. 1.
Figure 6:
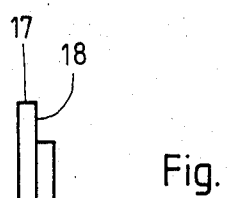
FIG. 6 is a side view of the inner wall of the compressor housing illustrating the air supply section.
Figure 7:
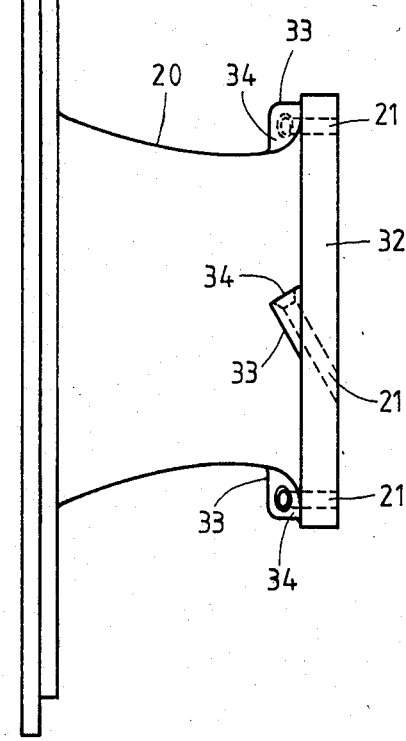
FIG. 7 is an enlarged sectional view of a portion of a compressor housing and illustrating an embodiment which varies somewhat from that shown in FIG. 5.
Figure 7:
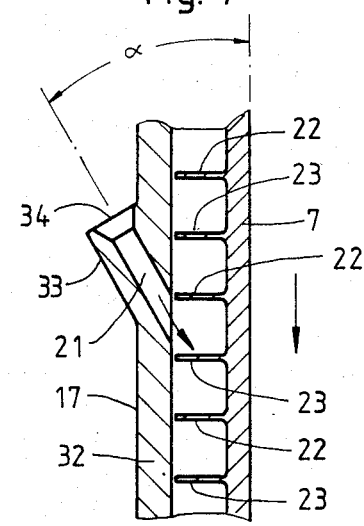
Figure 8:
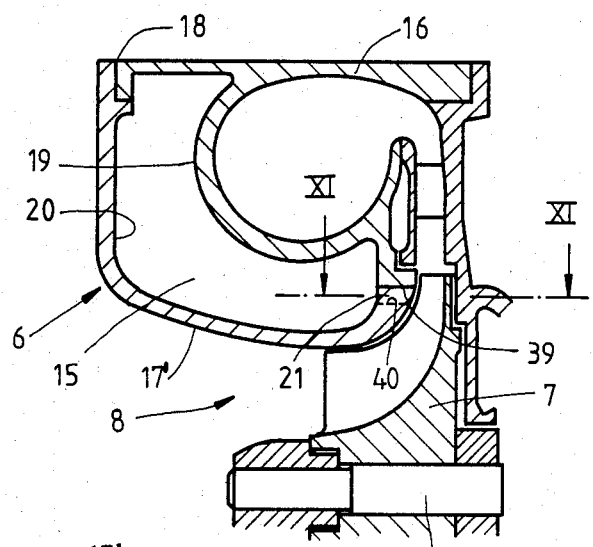
FIG. 8 is a view similar to FIG. 5, but illustrating another embodiment.
Figure 11:
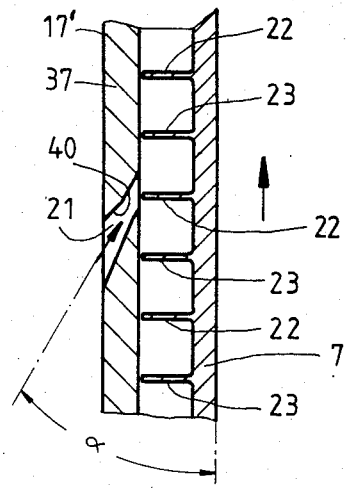
FIG. 11 is a fragmentary section through the compressor of FIG. 8 along line XI—XI of FIG. 8.
Figure 9:
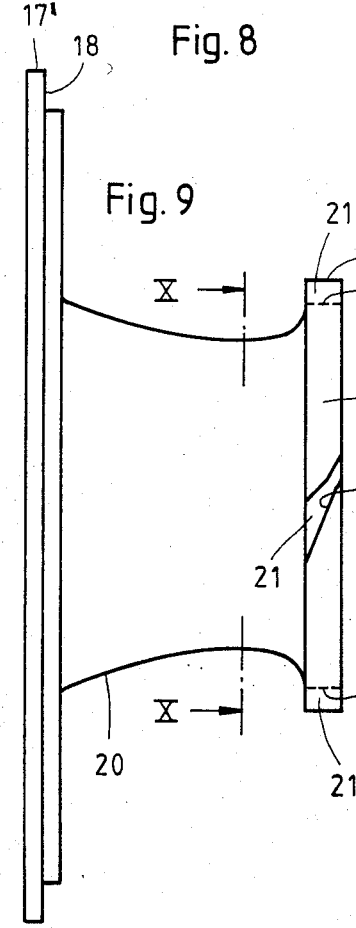
FIG. 9 is a side view of the inner supply wall of the compressor housing of FIG. 8.
Figure 10:
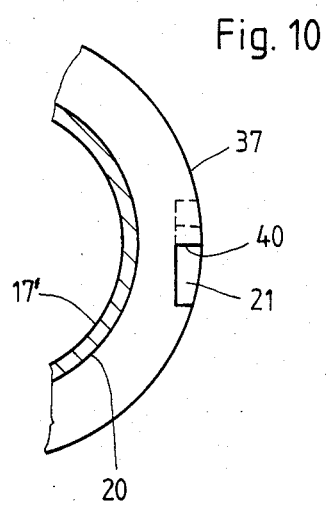
FIG. 10 is a fragmentary cross section along the line X—X of FIG. 9.

The exhaust gas turbosupercharger includes means to receive external energy which is applied if there is insufficient energy available from the exhaust gases of the ICE at inlet stub 10, for example for starting condition, acceleration of the ICE, and the like. The external energy, in accordance with this embodiment, comprises compressed air. The compressed air is derived from a compressed air tank 13, receiving compressed air from an inlet through a compressor 12. The compressed air tank 13 provides compessed air through an inlet line 14, selectively controllable by a valve 41 as will appear, to introduce compressed air into the compressor manifold or compressor storage chamber 15, formed within the compressor housing 6. The outlet side 16 includes the compressor spiral as well as the connection for the compressed air line to the ICE. Coaxially located therewith is a part 17 which forms the inlet funnel of the compressor housing 6. Both parts 16, 17 of the compressor housing 6 are located coaxially and secured in this coaxial arrangement by structural interengaging elements. Matching engagement surfaces 18 are provided which, also, are suitable surfaces for screw connections of the parts 16, 17. Such screw connections, being standard in the field, have been omitted from the drawing for clarity. Various other structures are possible; for example, FIG. 4 illustrates a different arrangement of the compressor housing. The details of the two-part arrangement of the compressor housing 6 are shown in FIGS. 5 to 7 for one embodiment, and in FIGS. 8 to 11 for another embodiment, and will be discussed in detail below. The compressed air chamber 15, in these embodiments, is defined by the outer side 19 of the part 16 and the outer side 20 of the part 17 of the compressor housing 6.

Figure 2:
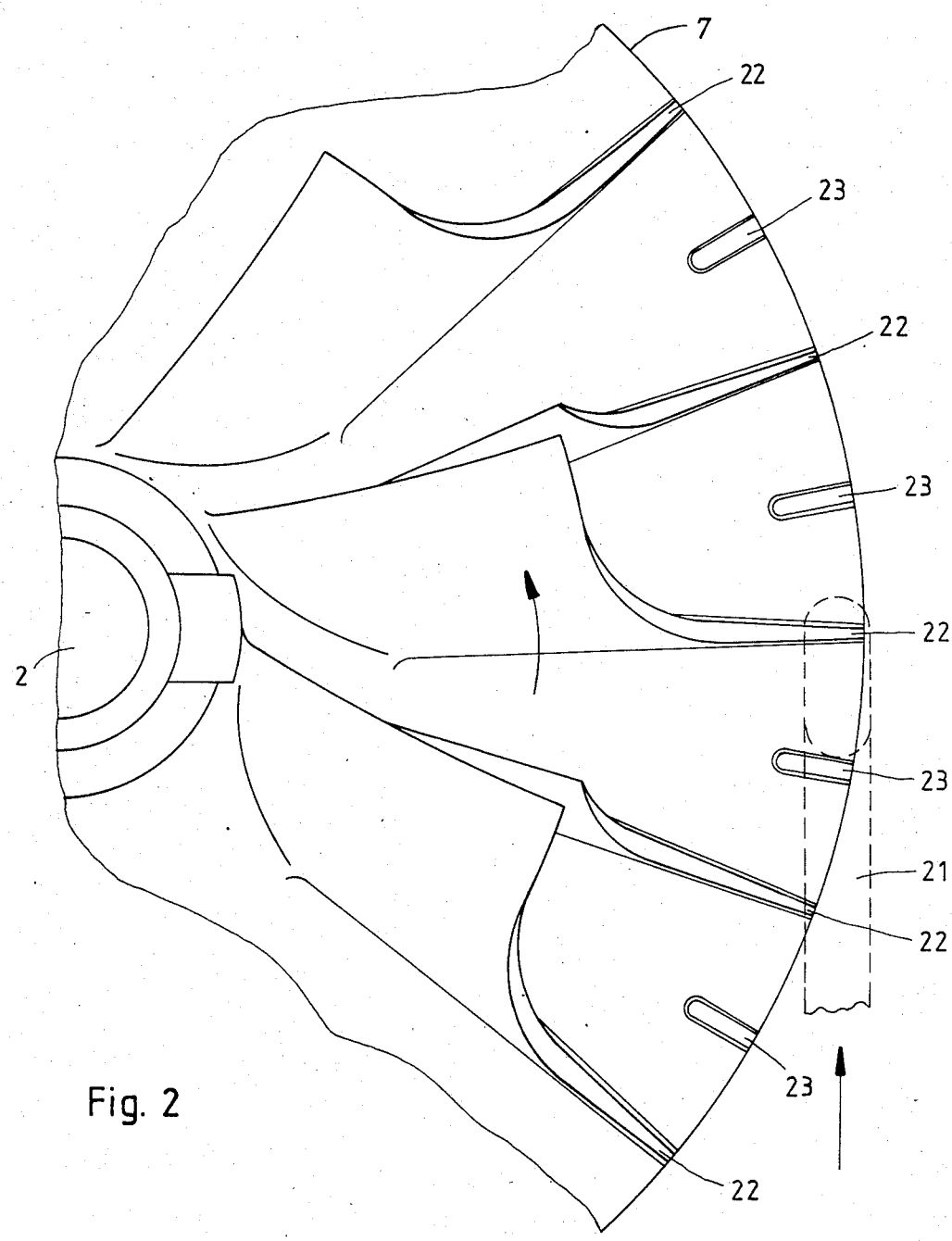
FIG. 2 is a partial front view of the compressor wheel, in the turbosupercharger, and illustrating a first embodiment of auxiliary vanes.

In general, that is, independently of the respective construction of the compressor housing 6, a plurality of nozzles, in the form of nozzle bores or nozzle ducts 21 extend from the compressed air chamber 15—see FIGS. 2, 4. The nozzles 21 guide and direct compressed air into the compressor housing 6 so that the compressed air will impinge at predetermined and selected zones on the compressor wheel 7.

In accordance with the invention, the compressor wheel 7 carries, besides the customary and standard compressor vanes or blades 22, an auxiliary set of compressor vanes or blades 23 which are uniformly distributed about the circumference thereof. In accordance with a feature of the invention, the axes of the nozzles 21 are directed at an angle which provides for optimum efficiency of compressed air—turbine operation energy transfer against the auxiliary vanes or blades 23. The auxiliary vanes or blades 23, collectively, form an auxiliary vane set or group.

Figure 3:
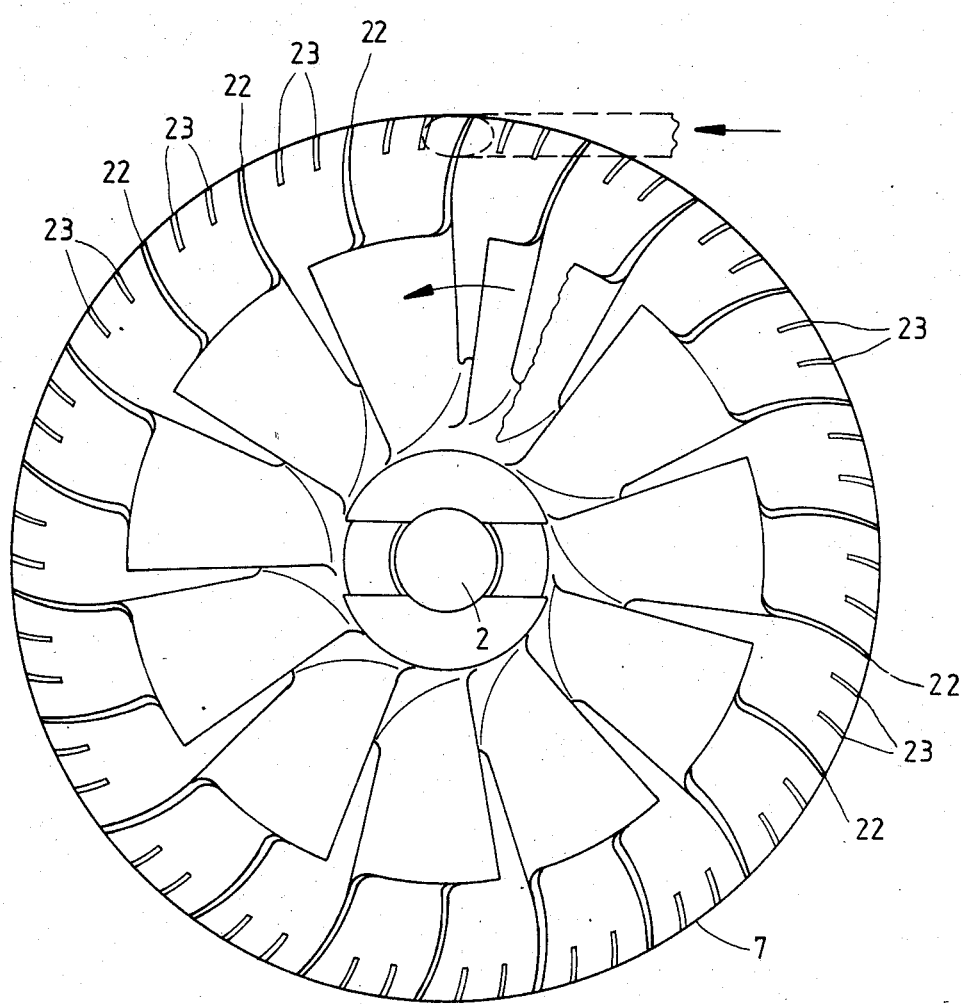
FIG. 3 is a front view of another embodiment of a compressor wheel.

The auxiliary vanes or blades 23 can be located in various places on the compressor wheel. They may be positioned, for example, on the front side of the compressor wheel which carries the standard vanes or blades, see FIGS. 2, 3. The arrangement of the auxiliary blades or vanes with respect to the standard or normally operating blades also can be as desired. For example, and as shown in FIG. 2, the auxiliary vanes 23 can be located between two compressor blades 22, forming the standard and normally present vanes or blades. As shown in FIG. 3, and alternatively with respect thereto, two or more auxiliary vanes or blades 23 can be located, uniformly distributed, in an angular range between two, each, adjacent compressor blades 22 of the normal or standard blade set. FIG. 4 illustrates an arrangement in which the standard blades are located on one side of the compressor wheel, normally termed the "front side" of the compressor wheel 7; the auxiliary vanes or blades 23 then are located on the rear or back side 24 of the compressor wheel. The number of auxiliary blades 23 can be the same as the number of the main or standard blades 22. This is not necessary, however, and the number of the auxiliary blades 23 located on the back side 24 of the compressor wheel 7 may differ from that of the main blades 22, for example, more auxiliary blades 23, or a lesser number of auxiliary blades 23 may be used than the main blades 22 at the front side of the compressor wheel 7.

The auxiliary compressor wheels 23, when located on the front side of the compressor wheel 7—see FIGS. 2 and 3—are preferably located between the main compressor blades 22 at, or close to the outer edge of the compressor wheel 7. In accordance with the embodiment of FIG. 4, where the auxiliary vanes or blades 23 are located on the back side of the compressor wheel 7, the auxiliary vanes or blades 23 may located either adjacent the outer edge of the compressor wheel 7 or somewhat radially inwardly thereof—with respect to the axis of rotation of the compressor wheel 7. Generally, the auxiliary vanes or blades 23 are substantially shorter than the main compressor blades 22. The auxiliary blades 23 which, of course, are turbine or drive blades, whereas the main blades 22 are compressor blades, may extend, as shown in FIG. 2, in radial direction and be essentially planar. Alternatively, however, the auxiliary drive vanes or blades 23 may be bent or bowed, as seen in FIG. 3. Specifically, they may be formed as backwardly curved blades.

The nozzles 21 are preferably so arranged that, in any event, more than two nozzles are placed to direct compressed air against the auxiliary drive vanes or blades 23. In actual practice, it has been found that an odd number of nozzles, for example five, seven or nine nozzles, uniformly distributed about a circle concentric with the axis of rotation of the turbine, is particularly desirable. As illustrated in all the embodiments, the axis of any one of the nozzles 27 is located in a plane parallel to the axis of the compressor wheel 7 and, in that plane, is directed towards the auxiliary drive vanes or blades 23 at such an angle that the stream of compressed air emitted from the respective nozzle 21 meets the plane of the compressor wheel 7 at an acute angle $\alpha$ of between about 15° to 25°—see FIGS. 7 and 11—and thus impinges at that angle on the surface of the auxiliary drive vanes or blades 23, which provides for drive torque transmission. Alternatively, the axis of any nozzle 21 can also be placed in a plane which is inclined with respect to the axis of rotation of the compressor wheel 7, so that the compressed air streams emitted from the respective nozzle impinges on the working suface providing for drive of the auxiliary drive vanes or blades 23 at an inclination which is so directed that the compressed air will flow off in preferred direction towards the outer circumference of the compressor wheel 7.

The nozzles 21, in the embodiments of FIGS. 4 and 5 to 7 and 12, are formed by inclined bores. In the embodiment of FIG. 4, on which the auxiliary vanes 23 are located on the back side of the wheel 7, the nozzles are formed as inclined bores in a separate wall portion 25 of the compressor housing 6. The separate wall portion 26 is formed with a projection or bump 27 at its outside 26, in the region of the respective nozzles 21. The projection or bump 27 has a flat surface 28 extending essentially at right angle to the axis of the respective nozzle bore 21. This surface insures precise construction of the nozzle bore since it permits reliable and precise engagement of a drill or boring tool thereagainst and precise guidance of the boring tool in the desired axis defining the nozzle opening.

Compressed air, collected in the chamber 15, is injected through the bores 21 into a space 29 in which the auxiliary compressor drive vanes or blades 23 are located. The space 29 is ring-shaped; radially inwardly, that is, towards the shaft of the compressor wheel 7, a labyrinth seal 30 seals and separates the space 29 from the running chamber of the wheel 7; upwardly—with respect to FIG. 4—a ring gap 31 permits escape of the compressed air into the interior of the compressor housing, for subsequent introduction into the air inlet of the ICE. The ring gap 31 is located between the outer circumference of the compressor wheel 7 and a suitable matching surface, slightly spaced therefrom, formed on the wall portion 25.

Figure 12:
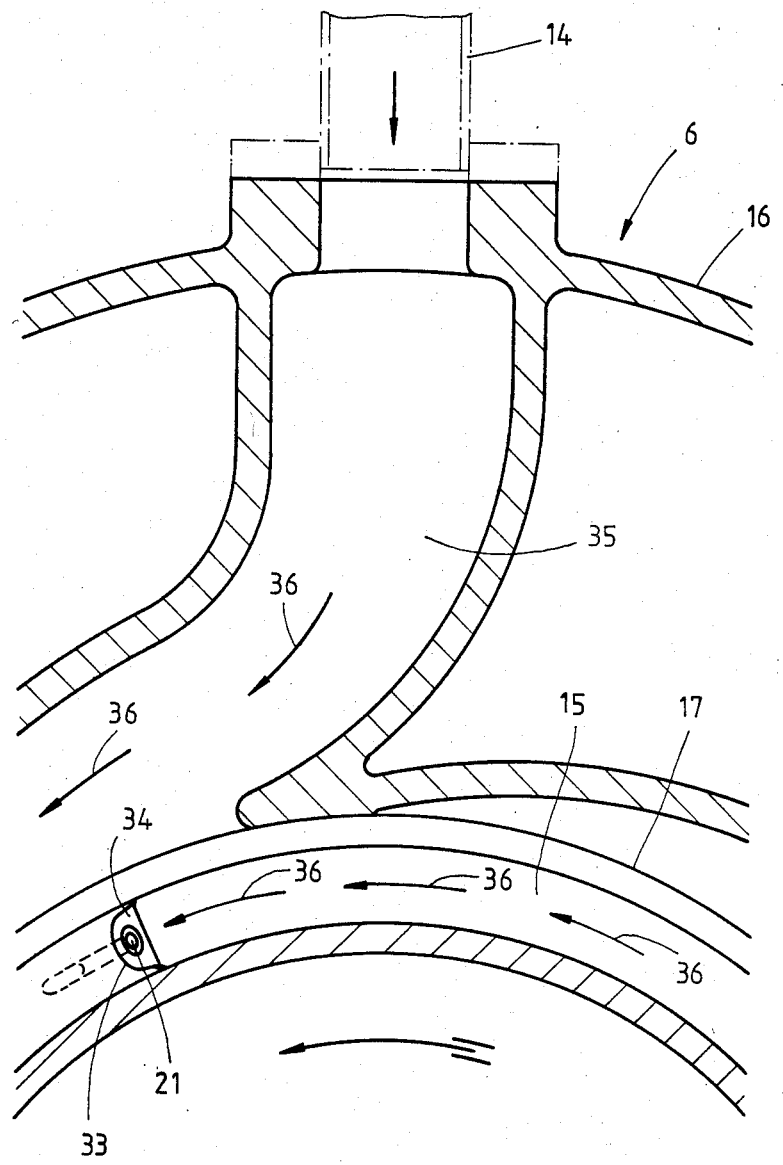
FIG. 12 is a fragmentary sectional view of another embodiment of a compressor housing.

In the embodiments of FIGS. 5 to 7, the injection ducts or nozzles 21 are constructed in the form of bores in the part 17 of the compressor housing 6. They penetrate the inner end 32 thereof which, in general, is flange-shaped. The part 16 is a casting. In the region of the air entry into the nozzle ducts 21, the casting is formed with an eye 33 having a flat surface 34 extending at right angles to the axis of the respective nozzle 21. The eye 33 is directly formed on the lower end 32 of the casting. The flat, planar surface 34 again insures precise and reliable engagement of a drill or boring tool thereagainst and exact guidance thereof to drill or bore the nozzle ducts 21 at the desired and precise angle. A similar arrangement is provided in the embodiment of FIG. 12, see part 17 thereof. In contrast to the embodiment in accordance with FIGS. 5 to 7, the embodiment of FIG. 12 shows the part 16 being bent or bowed in the region of connection to the compressed air duct 14 to form an internally bent or bowed duct 35. The duct 35 forms a channel which is so curved or bent that the air introduced into the chamber 15 will flow therein in tangential direction about the part 17 and is rotated already, to form a rotating stream within the chamber 15. Thus, the compressed air within the chamber 15 will receive a directional component, extending towards and in the direction of the inlet openings of the nozzle ducts 21. Arrows 36 in FIG. 12 show the direction of flow of the compressed air therein.

The nozzle ducts or openings need not be formed by bores. Referring to FIGS. 8 to 11, the nozzle ducts can be formed as transversely extending grooves which are worked into the flange-like inner end 37 of the part 17 of the part 17 of the compressor housing 6. The part 17 may be slightly modified in shape, and hence has been given the reference numeral 17' in FIGS. 8 to 11. The inner end 37 of part 17' has a circular, cylindrical outer surface 38 which fits against a matching cylindrical opening 39 located at the inner portion of the part 16, to be centered thereby. The wall of the bore 39 covers the nozzle ducts 21 when parts 16 and 17' are assembled together. The grooves, shown in FIGS. 8 to 11 at 40, are so cut into the flange-like inner end 37 of the part 17' of the compressor housing that they converge, in wedge or tapered shape, towards the nozzle opening at the ejection point of the air, in order to obtain a concentrated nozzle effect.

The system—see FIG. 1 includes a control valve 41 which, in turn, is connected to and controlled by a control unit of a control system 42, which receives command signals from a command line 43. The control system 42, selectively, commands opening and closing of the valve 41.

OPERATION

Let is be assumed that the ICE is operating under conditions in which no or only little exhaust gas is delivered to the exhaust gas turbine 5 of the turbosupercharger 1. This condition is typical for starting, that is, when the exhaust gas turbosupercharger first is placed into operation, or when the ICE is to be rapidly accelerated. Under those conditions, it is desirable that the turbosupercharger is rapidly brought to a higher speed than that of its prior operation. The control system 42 will receive a command signal from the control line 43 to open the valve 41, so that compressed air can flow from the compressed air tank 13 through line 14 into the compressed air chamber or inlet manifold 15 of the turbine housing 6, in order to be injected from there via the nozzles 21 into the interior of the compressor housing. In accordance with the present invention, the nozzles 21 direct this additional compressed air into the interior of the compressor housing in the region of the auxiliary drive blades 23 thereof. The compressed air streams emitted from the nozzles 21 thus cause extremely rapid acceleration of the exhaust gas turbine compressor wheel, so that, rapidly, the desired charge air supply for the ICE connected thereto will be obtained. The compressed air which is injected through the interior of the compressor housing flows through the compressor housing and thus increases the air mass which is supplied to the ICE.

The auxiliary drive vanes or blades permit substantial reduction of the spaces between the engagement surfaces for the compressed air, that is, the surfaces on which the compressed air streams become effective. Thus, the energy content of the compressed air can be utilized essentially entirely in order to provide rotary energy for the compressor wheel, and to convert the energy of the compressed air to rotary energy for compression of air supplied thereto. When the charge air has reached the desired quantity, control line 43 provides a command to the control unit 42 to close the valve 41, and thus disconnect supply of additional compressed air to the exhuast gas supercharger turbine which, then, will operate under its normal condition. Thus, the main or normally provided compressor blades 22 of the compressor wheel 7, by provision of the auxiliary drive vanes 23, will insure supply of desired charging air to the ICE.

Various changes and modifications may be made, and features described in connection with any one of the embodiments may be used with any of the others, within the scope of the inventive concept.

What is claimed is:

1. The combination of an internal combustion engine (ICE) with
    an exhaust gas turbosupercharger
    wherein the exhaust gas turbosupercharger includes
    a common shaft (2);
    an exhaust gas turbine (4) secured to the common shaft and pneumatically coupled to receive exhaust gases from the internal combustion engine;

a compressor housing (20);
a compressor wheel (7) secured to the common shaft and operable in the compressor housing, and providing compressed charging air to the internal combustion engine,
the compressor wheel having compression vanes or blades (22);
means for introducing auxiliary compressed air to the compressor wheel having
a source (12, 13) of compressed air,
means defining a compressed air chamber (15),
a controllable connection (41) between the source of compressed air and the compressed air chamber (15), and
nozzle means (21) pneumatically connecting the compressed air chamber (15) and the compressor wheel housing, and directing compressed air along a nozzle axis from the nozzle means against the compressor wheel to provide additional drive energy to the compressor wheel when the controllable connection is controlled to supply compressed air from the source (12, 13) to the chamber (15),
and comprising, in accordance with the invention,
a set of auxiliary drive vanes or blades (23) secured to the compressor wheel (7), the auxiliary drive vanes or blades of the set being uniformly distributed about the compressor wheel (7);
and wherein the axes of the nozzle means are positioned to direct the compressed air against the auxiliary drive blades or vanes (23) at an impingement angle providing at least approximately optimum energy transfer from the compressed air emitted through the nozzle means to the auxiliary drive vanes or blades.

2. Combination according to claim 1, wherein the compression vanes or blades (22) are located on a first facing side of the compressor wheel (7);
and wherein the auxiliary drive vanes or blades are located on said first side.

3. Combination according to claim 2, wherein the auxiliary drive vanes or blades (23) are located intermediately between two compression vanes or blades (22) on the compressor wheel (7).

4. Combination according to claim 2, wherein at least two auxiliary drive vanes or blades (23) are located within an angular range between two compression vanes or blades (22) on the compressor wheel (7).

5. Combination according to claim 1, wherein the compression vanes or blades (22) are located on a first facing side of the compressor wheel (7);
and wherein the auxiliary drive vanes or blades (23) are located on a second side of the compressor wheel forming a reverse or opposite side of said first side.

6. Combination according to claim 5, wherein the number of the auxiliary drive vanes or blades on the second side of the compressor wheel is the same as the number of the compression vanes or blades (22) on the first side of the compressor wheel (7).

7. Combination according to claim 5, wherein the number of the drive vanes or blades located on the second side (24) of the compressor wheel is larger than the number of the compressor vanes or blades (22) located on the first side of the compressor wheel (7).

8. Combination according to claim 5, wherein the number of the drive vanes or blades located on the second side (24) of the compressor wheel is smaller than the number of the compression vanes or blades (22) located on the first side of the compressor wheel (7).

9. Combination according to claim 1, wherein the auxiliary drive vanes or blades (23) are substantially shorter than the compression vanes or blades (22) of the compressor wheel (7).

10. Combination according to claim 1, wherein the auxiliary drive vanes or blades (23) are located adjacent the peripheral edge of the compressor wheel (7).

11. Combination according to claim 1, wherein the auxiliary drive vanes or blades (23) are located radially inwardly with respect to the periphery of the compressor wheel (7).

12. Combination according to claim 5, wherein the auxiliary drive vanes or blades (23) are located radially inwardly with respect to the perphery of the compressor wheel (7).

13. Combination according to claim 1, wherein the auxiliary drive vanes or blades (23) are essentially planar and extend radially on the compressor wheel (7).

14. Combination according to claim 1, wherein the auxiliary drive vanes or blades (23) are curved.

15. Combination according to claim 14, wherein the auxiliary drive vanes or blades (23) are formed as backwardly curved blades.

16. Combination according to claim 1, wherein a plurality of nozzle means (21) are provided, uniformly positioned about a circle concentric with the compressor wheel (7).

17. Combination according to claim 16, wherein the number of nozzle means is an odd number.

18. Combination according to claim 17, wherein the number of nozzle means is five or seven or nine.

19. Combination according to claim 16, wherein the axes of the nozzle means are located in a plane parallel to the axis of the compressor wheel (7), and positioned at an inclination so directed towards the auxiliary drive vanes or blades (23) that a stream of compressed air from the nozzle means will impinge the plane of operation of the auxiliary drive vanes or blades (23) secured to the compressor wheel at an acute angle of between about 15° to 25° on the drive-effective surface of the respective auxiliary drive vanes or blades.

20. Combination according to claim 1, wherein the axis of at least one of the nozzle means (21) is positioned in a plane which is non-parallel with respect to the axis of the compressor wheel (7) and is so inclined that streams of compressed air emitted from the nozzle means impinge at an inclination from between the axis of rotation of the compressor wheel and the outer periphery of the auxiliary drive vanes or blades (23), the auxiliary drive vanes or blades directing the stream of compressed air impinging thereon in a direction towards the outer periphery of the compressor wheel (7).

21. Combination according to claim 16, wherein the compressor housing includes a wall (32) positioned spaced from and adjacent to the auxiliary drive vanes or blades (23), said wall having a first surface adjacent the auxiliary drive vanes or blades (23) and a surface opposite thereto;
the nozzle means (21) being formed as bores extending through said wall;
and wherein the second surface of the wall (32) is formed with a projection (33) having a surface (34) extending essentially at right angles to the nozzle axis to provide an engagement surface for a nozzle duct drilling or boring tool and insuring precise guidance of said tool through the wall (32).

22. Combination according to claim 16, wherein the compressor housing (6) is formed as a two-part element including a separating wall having an outer circumference positioned adjacent the auxiliary drive vanes or blades, and a second part fitting against said outer circumference;

and wherein said nozzle means (21) are formed as inclined grooves (40) located in at least one of said parts at the junction surface between said parts, and having nozzle axes directing compressed air against said auxiliary drive vanes or blades (23).

* * * * *